United States Patent [19]

McCollum et al.

[11] Patent Number: 5,686,667

[45] Date of Patent: Nov. 11, 1997

[54] METHOD FOR DETERMINING THE APPROXIMATE RESONANCE FREQUENCY OF A STRUCTURE SURROUNDED BY A COMPRESSIBLE FLUID

[75] Inventors: Michele D. McCollum, Cocoa Beach; Clementina M. Siders, Orlando, both of Fla.

[73] Assignee: The United States of America as represented by the Secretary of the Navy, Washington, D.C.

[21] Appl. No.: 641,019

[22] Filed: Apr. 15, 1996

[51] Int. Cl.$^6$ ................................................ G01H 13/00
[52] U.S. Cl. .......................... 73/579; 73/602; 364/550; 364/551.01
[58] Field of Search .......................... 73/579, 580, 581, 73/582, 583, 602; 364/550, 551.01, 484

[56] References Cited

U.S. PATENT DOCUMENTS

| | | | |
|---|---|---|---|
| 4,061,017 | 12/1977 | Sloane et al. | 73/579 |
| 4,341,111 | 7/1982 | Husar | 73/64.42 |
| 4,926,691 | 5/1990 | Franklin et al. | 73/579 |
| 5,327,358 | 7/1994 | Stubbs | 73/577 |
| 5,493,511 | 2/1996 | Wincheski et al. | 73/577 |

Primary Examiner—Hezron E. Williams
Assistant Examiner—Nashmiya Ashraf
Attorney, Agent, or Firm—Michael J. McGowan; Michael F. Oglo; Prithvi C. Lall

[57] ABSTRACT

A method for determining the approximate resonance frequency of a structure surrounded by a compressible fluid includes the steps of: (1) performing analysis to determine in-vacuo frequencies and mode shapes of the structure; (2) selecting an in-vacuo mode of interest, (3) computing an influence matrix at the eigenfrequency of the selected mode of interest; (4) combining the computed influence matrix with structural stiffness and mass matrices from a finite element program, and using the modified matrices computing eigenvalues of the structure, including eigenvectors; (5) selecting from the computed eigenvectors a computed mode having substantially the same displaced shape as the in-vacuo mode of interest; (6) determining the eigenfrequency of the selected computed mode; (7) determining any difference between the computed eigenfrequency of the selected computed mode and the in-vacuo eigenfrequency of the selected in-vacuo mode of interest. The process iteratively returns to step (3) until the eigenvalues of the selected computed mode of step (5) and the in-vacuo eigenvalue substantially converge.

3 Claims, 9 Drawing Sheets

COMPARISON OF IN VACOU EIGENFREQUENCIES OF A SPHERICAL SHELL, COMPUTED FROM ANALYTIC AND FINITE ELEMENT MODELS

| MODE NUMBER/BRANCH | ANALYTIC (HZ) | FINITE ELEMENT (HZ) | % DIFFERENCE |
|---|---|---|---|
| 2/LOWER | 591 | 591 | 0.0 |
| 3/LOWER | 700 | 700 | 0.0 |
| 4/LOWER | 742 | 744 | 0.3 |
| 0/UPPER | 1357 | 1360 | 0.2 |

FIG. 1

COMPARISON OF UNDAMPED IN-WATER EIGENFREQUENCIES OF A SPHERICAL SHELL, COMPUTED FROM ANALYTIC AND FINITE ELEMENT/ BOUNDARY ELEMENT (FE/BE) MODELS

| MODE NUMBER/BRANCH | ANALYTIC EIGENFREQUENCY (HZ) | FE/BE EIGENFREQUENCY (HZ) | % DIFFERENCE | ka AT ANALYTIC EIGENFREQUENCY |
|---|---|---|---|---|
| 2/LOWER | 268 | 272 | 1.5 | 1.1 |
| 3/LOWER | 330 | 342 | 3.6 | 1.4 |
| 4/LOWER | 389 | 391 | 0.5 | 1.6 |
| 0/UPPER | 1028 | 1069 | 4.0 | 4.3 |

FIG. 2

COMPARISON OF UNDAMPED IN-WATER EIGENFREQUENCIES WITH THE UNDAMPED IN-WATER HARMONIC RESONANCE FREQUENCIES FOR A SPHERICAL SHELL, BOTH COMPUTED WITH THE FE/BE MODEL

| MODE NUMBER/BRANCH | EIGENFREQUENCY (HZ) [Re{Z}=0] | RESONANCE FREQUENCY (HZ) [Re{Z}=0] | % DIFFERENCE |
|---|---|---|---|
| 2/LOWER | 272 | 272 | 0.4 |
| 3/LOWER | 342 | 342 | 0.0 |
| 4/LOWER | 391 | 391 | 0.0 |
| 0/UPPER | 1069 | 1049 | 1.9 |

FIG. 3

COMPARISON OF IN-WATER HARMONIC RESONANCE FREQUENCIES FOR A SPHERICAL SHELL, COMPUTED USING THE FE/BE MODEL, WITH AND WITHOUT RADIATION DAMPING

| MODE NUMBER/BRANCH | RESONANCE FREQUENCY (HZ) [Re{Z}=0] | RESONANCE FREQUENCY (HZ) [COMPLEX Z] | % DIFFERENCE |
|---|---|---|---|
| 2/LOWER | 271 | 267 | 1.5 |
| 3/LOWER | 342 | 341 | 0.3 |
| 4/LOWER | 391 | 391 | 0.0 |
| 0/UPPER | 1049 | 1049 | 0.0 |

FIG. 4

COMPARISON OF IN-WATER EIGENVALUES FOR A SPHERICAL SHELL COMPUTED USING THE FE/BE MODEL, WITH THE IN-WATER MODEL TECHNIQUE, NEGLECTING RADIATION DAMPING; AND THE INCOMPRESSIBLE APPROXIMATION (NO RADIATION DAMPING AND THE MASS LOADING COMPUTED AT ka=0)

| MODE NUMBER/BRANCH | IN-WATER EIGENFREQUENCY (HZ) [ITERATIVE METHOD] | IN-WATER EIGENFREQUENCY (HZ) [INCOMPRESSIBLE, ka=0] | % DIFFERENCE | ka OF IN-WATER EIGENVALUE [ITERATIVE METHOD] |
|---|---|---|---|---|
| 2/LOWER | 272 | 291 | +7.0 | 1.1 |
| 3/LOWER | 342 | 359 | +5.0 | 1.4 |
| 4/LOWER | 391 | 404 | +3.3 | 1.6 |
| 0/UPPER | 1069 | 361 | −66.0 | 4.5 |

FIG. 5

COMPARISON OF IN VACOU AND IN-WATER EIGENFREQUENCIES, AND IN-WATER HARMONIC RESONANCE FREQUENCIES, FOR AXISYMMETRIC FE(/BE) PROJECTOR MODEL

| MODE NUMBER | IN VACOU EIGENFREQUENCY (HZ) | IN-WATER EIGENFREQUENCY (HZ) | IN-WATER HARMONIC PEAK FREQUENCY (HZ) [Re{Z}=0] | IN-WATER HARMONIC PEAK FREQUENCY (HZ) [COMPLEX Z] | ka OF IN-WATER EIGENVALUE |
|---|---|---|---|---|---|
| 1 | 84 | 38 | 38 | 38 | 0.16 |
| 2 | 456 | 307 | 307 | 303 | 1.30 |
| 4 | 1092 | 852 | 851 | 838 | 2.80 |
| 5 | 1904 | 1685 | 1682 | 1670 | 7.00 |

FIG. 6

CONVERGENCE OF IN-WATER EIGENVALUES USING AXISYMMETRIC FE/BE PROJECTOR MODEL

| STARTING MODE NUMBER | STARTING VALUE (HZ) | ITERATION 1 (HZ) | ITERATION 2 (HZ) | ITERATION 3 (HZ) | ENDING MODE NUMBER |
|---|---|---|---|---|---|
| 1 | 84.0 | 38.6 | 38.4 | --- | 1 |
| 2 | 456.0 | 310.6 | 307.3 | 307.4 | 2 |
| 4 | 1092.0 | 846.6 | 851.7 | 851.5 | 4 |
| 5 | 1904.0 | 1666.7 | 1686.2 | 1684.2 | 6 |

FIG. 7

IN VACOU AND IN-WATER EIGENFREQUENCIES FOR 3-D FE/BE PROJECTOR MODEL

| MODE NUMBER | IN VACOU EIGENFREQUENCY (HZ) | IN-WATER EIGENFREQUENCY (HZ) | IN-WATER HARMONIC PEAK FREQUENCY (HZ) [Re{Z}=0] | [COMPLEX Z] | ka OF IN-WATER EIGENVALUE |
|---|---|---|---|---|---|
| 5 | 90 | 43 | 41 | 41 | 0.18 |

FIG. 8

CONVERGENCE OF FUNDAMENTAL DISK MODE USING 3-D PROJECTOR MODEL

| STARTING VALUE (HZ) | ITERATION 1 (HZ) | ITERATION 2 (HZ) |
|---|---|---|
| 90.0 | 42.9 | 43.0 |

FIG. 9

COMPARISON OF CPU TIME FOR HARMONIC AND MODIFIED MODAL COMPUTATIONS FOR FUNDAMENTAL DISK MODE OF 3-D PROJECTOR MODEL

| ANALYSIS | CPU SECONDS PER FREQUENCY/ITERATION | NUMBER OR FREQUENCIES/ITERATIONS | TOTAL CPU SECONDS |
|---|---|---|---|
| HARMONIC | 2234 | 10 | 22,340 |
| MODIFIED MODAL | 907 | 2 | 1,814 |

FIG. 10

METHOD FOR DETERMINING THE APPROXIMATE RESONANCE FREQUENCY OF A STRUCTURE SURROUNDED BY A COMPRESSIBLE FLUID

STATEMENT OF GOVERNMENT INTEREST

The invention described herein may be manufactured and used by or for the Government of the United States of America for governmental purposes without the payment of royalties thereon or therefor.

BACKGROUND OF THE INVENTION

1. Field of the Invention

This invention relates to methods for determining the approximate resonance frequencies of underwater structures, and is directed more particularly to such a method as is more efficient than current harmonic sweep methods and more accurate than modal finite element/boundary element methods, the latter being based on an assumption of fluid incompressibility.

2. Description of the Prior Art

Usually when modeling a structure in water, one is interested in either 1) how the structure behaves in a certain frequency range, or 2) at what frequency one obtains a desired mode shape. This invention is concerned with the latter. The classical approach is to perform an in-water modal analysis to determine the in-air resonance frequencies. After displaying the mode shapes, one determines a mode shape of interest, and therefore a resonance frequency of interest. One then performs an in-water harmonic analysis by first estimating a coarse frequency range and then refining the range to capture the resonance frequency within a desired tolerance. For large models this is a very time consuming process.

There is thus a need for a technique for determining the resonance frequencies of such structures in a more efficient manner.

The behavior of complex fluid-loaded structures typically is modeled using one of the following methods: 1) mathematically describing the structure and surrounding fluid with finite elements, that is, regional subdivisions of the structure in each of which the behavior is described by a separate set of assumed functions representing the stresses or displacements in a given region; 2) describing the structure with finite elements and the fluid with boundary elements, that is, two-dimensional elements located on the wetted surface of the structure, such elements describing the acoustic loading of the structure; and 3) describing the structure with finite elements and the fluid with a combination of finite elements and infinite elements, that is, elements used in conjunction with finite elements to define the exterior fluid. These infinite elements allow the domain of a finite fluid element to extend to infinity in one or more directions by mapping an infinite domain into a finite domain. For all three methods, the fluid-loaded behavior is generally determined using a harmonic, i.e., forced, analysis involving computations at each frequency over a specified range of frequencies. Since the in-water resonance frequency, that is, the frequency at which the input reactance vanishes and the input resistance is small, is not known a priori, this procedure can involve multiple frequency sweeps. Some finite element programs do offer a fluid-loaded modal analysis, but the use of finite elements to model the fluid implies many additional degrees of freedom in the system of equations. See The Finite Element Method, by O. C. Zienkiewicz (McGraw-Hill UK, London, 1977), 3rd ed. A combination of finite and infinite elements to model the fluid results in fewer additional degrees of freedom, but, at present, in-fluid modal analysis is not offered in the major codes possessing infinite elements. As with infinite elements, modeling the fluid with boundary elements does not result in any additional degrees of freedom for the fluid, which is desirable. However, because this method is based on a frequency-dependent influence matrix to describe the fluid, either one must make the assumption that the fluid is incompressible, in which case the fluid influence matrix is approximated by its low frequency limit, see "Solution of Elasto-Acoustic Problems using a Variational Finite Element/Boundary Element Technique," by J. P. Coyette and K. R. Fyfe, in Numerical Techniques in Acoustic Radiation, edited by R. J. Bernhard and R. F. Keltie, NCA-Vol. 6 (ASME, New York, 1989), or one must know the in-water eigenfrequency a priori in order to accurately compute the fluid load. The fluid influence matrix is a complex, frequency dependent, symmetric matrix that represents the mass loading (imaginary part) and damping (real part) effects of an exterior or interior fluid on the vibration of a structure. In the case of an enclosed interior fluid, the real part of the influence matrix is zero.

The usual procedure for determining the resonance frequency of structures, using boundary elements to represent the fluid, is as follows:

1) Perform an in vacuo eigenvalue analysis using a finite element model to determine the frequencies and modes of the structure in question. The eigenvalue equation is:

$$[K]-\omega_i^2[M]\phi_i=0 \qquad (1)$$

where [K] is the stiffness matrix, [M] is the consistent mass matrix, $\omega_i^2$ is the set of eigenvalues, and $\phi_i$ is the set of orthogonal eigenvectors. This equation is written for elastic structures, although the structure can also be piezoelectric or magnetostrictive.

2) Use boundary elements to compute the influence matrix over a selected frequency range to attempt to encompass the in-fluid resonance frequency of interest. Usually, a coarse frequency resolution is used initially since the in-fluid frequency is not known a priori.

3) Compute the forced fluid-loaded behavior of the structure by performing a harmonic analysis using mass and stiffness matrices (computed by a finite element program) and the influence matrix. The harmonic equation is $$[K]-\omega^2[M]+j\omega[Z(\omega)]u=F, \qquad (2)$$

the frequency of excitation, Z(ω) is the influence matrix, {u} is the vector of computed nodal displacements, and {F} is the vector of specified applied forces. The derivation of this equation may be found in "A Coupled Finite Element/Boundary Element Approach for Predicting the Performance of High-Powered, Low-Frequency Projectors with Two Applications (U)," by R. E. Montgomery, C. M. Siders, and T. A. Henriquez, Journal Underwater Acoustics, Special Issue on Transducers, January 1991, and in "Numerical Solution of Acoustic-Structure Interaction Problems," by H. A. Schenck and G. W. Benthien, Naval Ocean Systems Center Technical Report 1263, April 1989. If [Z] is computed using a nodal boundary element code, then it is brought into the equation unmodified. If it is computed using a "patch" boundary element code, then the third term in Equation (2) becomes: $j\omega[X][Z(\omega)][X]^T$, where [X] is a matrix that translates between field variables at the centroid of a patch and the equivalent variables at the nodes.

4) Examine the computed nodal displacements to determine if the behavior of the structure at any frequency in the selected frequency range matches the behavior desired mode. If the desired mode is not present in the frequency range, a new frequency range must be chosen and the user must go back to step 2. If the displaced shape of interest is present in the frequency range that was run, proceed to the next step.

5) The approximate in-fluid resonance frequency is the frequency at which the structural displacement is a maximum. To determine this frequency, one must examine the displacement at a node that is significant for the mode of interest. Specifically, one must not select a node whose displacement is zero or nearly zero for the mode of interest.

6) Refine the approximation of the in-fluid resonance frequency by choosing a smaller frequency step in a shorter range of frequencies about the frequency identified in step 5, and recompute the in-water displacements.

7) Repeat steps 2–6 until the resonance frequency is determined with the desired accuracy.

The above computations can be lengthy and time consuming inasmuch as step (6) can require repeated choices or approximations of in-fluid resonance frequencies about the frequency identified in step (5). To shorten such computations, knowledge of the approximate in-water frequency is required (usually not known). The above procedure can provide an accurate calculation of the fluid-loaded behavior of the structure; however, it can be computationally prohibitive for realistic structures for which the fluid-loaded resonance frequency is not known a priori.

There is thus a need for a method for determining the resonance frequency of a structure surrounded by a compressible fluid, wherein the compressibility of the fluid is a factor and wherein the in-water resonance frequency can be computed based upon a known frequency of the structure.

SUMMARY OF THE INVENTION

It is, then, an object of the invention to provide a method for using boundary elements in a fluid-loaded modal analysis that eliminates the need for a priori knowledge of the in-water eigenfrequency, and that does not require the assumption of incompressibility.

With the above and other objects in view, as will hereinafter appear, a feature of the present invention is the provision of a method for determining the approximate resonance frequency of a structure surrounded by a compressible fluid, the method comprising the steps of: (1) using a finite element model, performing an in-vacuo eigenvalue analysis to determine in-vacuo frequencies and mode shapes of the structure; (2) selecting one of the mode shapes as an in-vacuo mode of interest, along with an attendant eigenfrequency thereof; (3) using a boundary element program, computing an influence matrix at the eigenfrequency of the selected mode of interest; (4) combining the computed influence matrix with structural stiffness and mass matrices from a finite element program, and using the modified matrices, computing eigenvalues of the structure, as well as eigenvectors; (5) selecting from the computed eigenvectors a computed mode having substantially the same displaced shape as the in-vacuo mode of interest; (6) determining the eigenfrequency of the selected computed mode; (7) determining any difference between the computed eigenfrequency of the selected computed mode and the in-vacuo eigenfrequency of the selected in-vacuo mode of interest; wherein (8) if the difference is equal to, or less than, a selected tolerance, the computed eigenfrequency of the computed mode is the approximate resonance frequency of the structure surrounded by compressible fluid; and (9) if the difference is greater than the tolerance, repeating step (3) substituting the computed eigenfrequency of the selected computed mode for the in-vacuo eigenfrequency for the in-vacuo mode of interest, and thereafter, repeating steps (4)–(9), substituting in step (3) a most recent computed eigenfrequency of the selected computed mode for the previously used computed eigenfrequency of the selected computed mode.

The above and other features of the invention will now be more particularly described with reference to the accompanying drawings and pointed out in the claims. It will be understood that the particular method embodying the invention is described and shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings:

FIGS. 1–10 are charts illustrative of numerical values determined in Examples #1 and #2 set forth in the specification.

DESCRIPTION OF THE PREFERRED EMBODIMENTS

Figure 11:
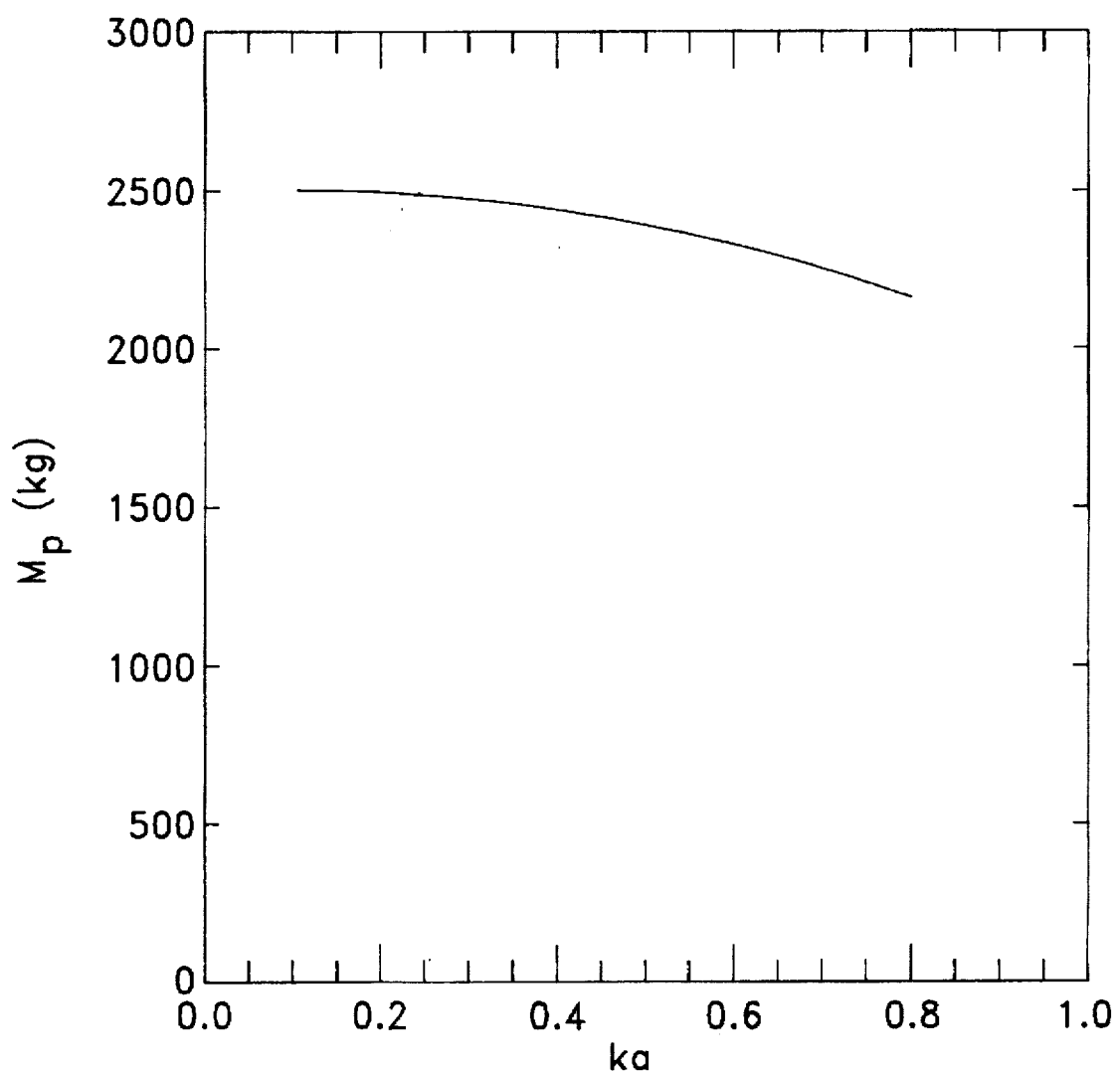
FIG. 11 is a graph illustrative of numerical values determined in connection with a mathematical model of a piston surrounded by an infinite baffle discussed in the specification.

The objective of the inventive method is to compute in-fluid modal frequencies using boundary elements to describe the fluid, without assuming the fluid to be incompressible. This approach eliminates both the hit-and-miss of the harmonic boundary element procedure described above, and the necessity of meshing a portion of the infinite fluid domain, as in the finite element approach. As stated before, the reason this is not possible with the usual boundary element description is that the computation of the fluid influence matrix requires knowledge of the in-fluid frequency of the mode of interest. Of course, in the absence of the experimental measurements, the designer does not know this frequency. What is known, or is readily ascertainable, is the in vacuo frequency of the mode. In the method described below, the in vacuo frequency is used as the starting point of an iterative eigenvalue analysis.

The equation for a standard in-vacuo finite element eigenvalue analysis is as follows:

$$[K] - \omega_i^2 [M] \phi_i = 0 \tag{3}$$

where $\omega_i$ and $\phi_i$ (i=1 to n) represent the eigenvalues and eigenvectors, respectively, of the in-vacuo structure. For the examples presented herein, the stiffness matrix is assumed to be real; that is, there is no structural damping. Structural damping can be included, leading to a complex eigenvalue analysis, but its effect on the eigenvalues is usually small.

The idea of the present analysis is to include the fluid loading in the eigenvalue equation. As stated hereinabove, the real part of the influence matrix [R], describes the radiation damping, and the imaginary part divided by the radian frequency describes the added mass of the fluid. The radiation damping and mass can be added to the structural stiffness and mass matrices, respectively. These additional terms are frequency dependent; however, choosing a specific angular frequency, $\omega_o$, we have the following relation:

$$\left\{ ([K] + j\omega_o [R(\omega_o)]) - \omega_i^2 \left( [M] + \frac{[X(\omega_o)]}{\omega_o} \right) \right\} \{\phi_i\} = \{0\} \quad (4)$$

For simplicity, we can rewrite as:

$$\{[K'] - \omega_i^2 [M']\}\{\phi_i\} = \{0\} \quad (5)$$

where $$[K'] = [K] + j\omega_o [R(\omega_o)], \quad (6)$$

and $$[M'] = [M] + \frac{[X(\omega_o)]}{\omega_o}. \quad (7)$$

Note that $[R(\omega_o)]$ and $[X(\omega_o)]/\omega_o$ each comprises a matrix of constants; therefore Equation (5) is a mathematically valid eigenvalue equation. (The form of an eigenvalue equation requires that [K] and [M] not depend on $\omega$.) Nevertheless, Equation (5) only represents the physical behavior of one in-fluid eigenvector. That is, if $\omega_i = \omega_o$ for some i, and $[Z(\omega)]$ is computed at $\omega_o$, then Equation (5) will give the correct eigenvector corresponding to the eigenvalue $\omega_i$. There are (n−1) other eigenvalues and eigenvectors, but none of them has the correct fluid loading since [Z] is computed at the frequency corresponding to mode i. For this reason, one can only use this method for determining one in-fluid eigenvalue at a time. For practical design problems, this is not a serious limitation because the designer is generally only interested in one mode.

The problem remains of finding the value of the eigenfrequency for the particular mode of interest. To do this, we begin with the only information that is available, that is, the in-vacuo eigenvalue of the mode of interest. We compute the influence matrix at this frequency, modify the mass matrix (and the stiffness matrix if desired), and solve the resulting eigensystem. If the modes remain uncoupled under fluid loading, we will find that there is a mode in the set of in-fluid eigenvectors that matches the shape of the in vacuo mode of interest. We then obtain the frequency corresponding to this mode, recompute the influence matrix at this frequency, and so on, until two consecutive in-fluid eigenvalue computations match, for the mode of interest, within a specified tolerance.

This new procedure for determining the fluid-loaded resonance frequency of a structure is as follows:

Perform an in-vacuo eigenvalue analysis using a finite element model to determine the in vacuo frequencies, and mode shapes. This step is the same as step 1 in the above described prior art method. Select the mode of interest, i, and its eigenfrequency. The in vacuo eigenfrequency of interest is designated $f_o$.

Compute the influence matrix, [Z], at $f_o$ using a boundary element program.

Solve a modified eigenvalue problem using the mass and stiffness matrices from a finite element program and the computed influence matrix. The equation used here is:

$$\{[K''] - \omega_i^2 [M'']\}\{\phi_i\} = \{0\} \quad (8)$$

where $$[K''] = [K] + j\omega_o Re[z(\omega_o)] \quad (9)$$

and $$[M''] = [M] + \frac{Im[Z(\omega_o)]}{\omega_o}, \quad (10)$$

and $\omega_o = 2\pi f_o$. "Re" and "Im" represent the real part and imaginary part, respectively, of the complex [Z]. In Equation (8), the structural mass matrix has been modified to include the entrained fluid mass (radiation mass), and the structural stiffness matrix has been modified to include the radiation damping. In practice, the effect of radiation damping on the in-fluid eigenfrequency is much smaller than that of the radiation mass, so that the stiffness matrix can be left unmodified. With this simplification, the complex eigenvalue problem, Equation (8), becomes purely real.

Examine the computed eigenvectors to determine which mode has the same displaced shape as the selected in vacuo mode of interest. The computed frequency of the selected mode is designated f.

Compare f and $f_o$. If the difference is less than a specified tolerance, then f is the approximate fluid-loaded resonance frequency. If the difference is greater than the specified tolerance, then set $f_o = f$ and return to computation of the influence matrix and repeat the steps thereafter.

The procedure outlined above is based on complex eigenfrequency computations, which require significantly more computation time than real eigensolutions. However, for most problems, the in-fluid eigenfrequency is determined primarily by the added mass of the fluid, so that the effects of the radiation damping can be ignored. In this case, [K']=[K] and the eigensolution becomes purely real. The differences between the in-water resonance frequencies with and without radiation damping will be examined hereinbelow.

At this point, an operator may be concerned with the number of iterations required to determine the in-fluid eigenfrequency. If the procedure requires a large number of iterations, it might be faster just to perform a harmonic frequency sweep over a very wide frequency range. This is a valid concern, but it turns out that at low ka, where ka is the non dimensional wave number (we are restricted to low ka for mode preservation, at least in theory), the solution converges very quickly. In fact, the first iteration in the modified eigensolution, that is, the solution for which the [Z] matrix is computed at the in vacuo frequency, results in a reasonable estimate of the in-fluid eigenfrequency. The reason for this can by understood by studying the classical problem of the fluid loading on a piston in an infinite baffle. The added mass of a piston on an infinite baffle is given by:

$$M_p = \frac{X_p(\omega)}{\omega} = \frac{\pi \rho_o a^3 H_1(2ka)}{K^2 a^2} \quad (11)$$

where a is the radius of the piston, $\rho_o$ is the density of the medium, k is the fluid wave number, and $H_1$ is the first order Struve function. For ka<<1, this becomes:

$$M_p = \frac{8\rho_o a^3}{3} \quad (12)$$

so the added mass is constant for small values of ka. Moreover, as ka increases to values near one, the added mass of Equation (11) changes slowly, as shown in FIG. 11. The implication of this is that for low ka, the added mass of the fluid computed at the in vacuo eigenfrequency is not very much different from the correct added mass computed at the in-fluid eigenfrequency. The in-fluid frequency is always lower than the in vacuo value, so we are headed in the direction of lower ka. This concept will be demonstrated for a realistic underwater projector hereinbelow.

The modified eigenvalue procedure described above has been applied to several problems. In each case the ATILA (Analyse de Transducteurs par Integration des equations de LAplace) finite element and the CHIEF boundary element codes were used. The modified modal analysis was implemented in two ways. In both implementations, the CHIEF code was used to generate the fluid influence matrix. In the first implementation, the stiffness and mass matrices were computed by ATILA and written to an external file. This file and the file created by CHIEF were read into an external program where they were combined and solved using standard LAPACK modal routines. Both real and complex eigensolutions (the latter included radiation, but not structural, damping) were performed, but the use of the external program was limited to very small problems because of computer memory. In the second implementation, the CHIEF influence matrix was brought into ATILA, and used to modify the mass matrix. Then a standard ATILA modal analysis was performed. The reason for modifying only the mass matrix is that the ATILA code performs a real eigenvalue solution.

Two examples will be presented here: a water-loaded spherical shell, and a mechanically driven projector in water. In the latter case, the method has been applied to both a two-dimensional (2-D) and a three-dimensional (3-D) model. Results will include in vacuo and in-water eigenfrequencies and modes, and the harmonic response with and without radiation damping. In addition, the error introduced by assuming incompressibility of the fluid will be presented.

EXAMPLE 1

The first example is a water-loaded spherical steel shell, the geometry of which has been chosen to match that of Junger and Feit in "Sound, Structures, and their Interaction" by M. C. Junger and D. Feit (MIT Press, Cambridge, Mass.) 1972. The behavior of the shell is assumed to be axisymmetric. The ratio of the thickness to radius of the shell is 0.01, the Poisson's ratio is 0.30, the ratio of structural to fluid density is 7.67, and the ratio of plate speed in the shell to sound speed in the fluid is 3.53. In "Sound, Structures . . ." there are presented a transcendental equation and a table of results for undamped eigenfrequencies, neglecting flexural effects. The modes of the shell are characterized by a value of $n \geq 0$. For the n=0 mode, only one real eigenfrequency exists; this is the breathing mode. For each mode n>0 there are two eigenfrequencies. The two sets or branches of modes represent two different types of behavior. The $n \geq 2$ modes of the lower branch are characterized by predominantly radial motion, while the $n \geq 1$ modes in the upper branch have more tangential motion.

The axisymmetric ATILA finite element model of the spherical shell comprises 64 eight-noded quadrilateral elements, with each node having two displacement degrees of freedom. These elements represent the complete axisymmetric equations of motion, so that flexural effects are included. This model was used to compute the in vacuo eigenfrequencies and modes. The corresponding boundary element model consists of 64 line elements which coincide with the external boundary of the finite element mesh. The CHIEF code generates a 3-D mesh from the 2-D geometry, using a specified number of rotational symmetry blocks, nblks, and solves the equation set in three dimensions. In this case, the number of rotational symmetry blocks is 100. Because the resulting influence matrix is computed for the full 3-D mesh, it must be scaled by the factor $nblks/(2\pi)$ so that it represents the fluid impedance per radian, making it compatible with the axisymmetric finite element matrices.

FIG. 2 provides the in vacuo eigenfrequencies from "Sound, Structures . . .", which is incorporated by reference herein, and those from the ATILA finite element model, for the first few modes of the lower branch and the first mode of the upper branch. All frequencies are rounded to the nearest hertz. The percent differences between the two sets of results are computed relative to the analytic result. The fact that the two sets of frequencies are in such close agreement indicates that for this thickness-to-radius ratio and frequency range, flexural effects are negligible, and that the structural finite element model accurately represents the elastic behavior of the sphere.

FIG. 3 provides the undamped in-fluid eigenfrequencies from "Sound, Structural . . ." and those from the modified modal analysis implemented in the ATILA code, for the first three nonzero eigenfrequencies of the lower branch (ka~1.1 to 1.6), and the first eigenfrequency of the upper branch (ka~4). The radiation damping is neglected for both sets of results. The differences are again computed relative to the analytic result. This part of the analysis was limited to low order modes to avoid the need for a finer numerical mesh. In FIG. 3 the largest difference between the undamped in-water modal frequencies for the modified finite element/boundary element (FE/BE) method and the analytic method is 4.0%.

The number of iterations required to reach convergence to within one hertz for the results in FIG. 3 varied between four and seven. Had the convergence tolerance been specified as a percentage of the eigenvalue, it is assumed that roughly four iterations would have been required for any of the modes. This result was obtained without using any of the various techniques available for speeding up the convergence process, for example, the bisection method. The low number of iterations is, therefore, somewhat surprising, especially as the mode order and ka increase. As ka increases, the variation of the added mass with frequency becomes more significant, so that the initial estimate would be expected to be worse, requiring more iterations before convergence. For realistic problems, this discussion is moot because the modes are not likely to be preserved at such high values of ka.

The differences shown in FIG. 3 are not entirely a result of the in-fluid modal method. A more appropriate test is to compare the results of the modified modal method with the results of a harmonic analysis using the same FE/BE model, since the peak in the harmonic response of the numerical model is what we are trying to determine. FIG. 4 presents this comparison under the conditions that the harmonic response is computed using only the imaginary part of the complex influence matrix. The percent differences are computed relative to the harmonic results. Comparing FIGS. 2, 3, and 4 we see that the differences between the in-water eigenfrequencies obtained from the analytic and FE/BE models are primarily a result of the differences in the way the fluid and the fluid/structure interaction are described. The fact that the in vacuo eigenfrequencies are in close agreement (FIG. 2) indicates that the structural models are equivalent. In any case, a difference of 4% is not considered to be significant.

The error caused by neglecting the effects of radiation damping can be determined by comparing the peaks in the harmonic response computed using only the imaginary part of the influence matrix with those computed using the complex influence matrix (see FIG. 5). The percent differences are computed relative to the latter results. The most significant effect of radiation damping is on the lowest mode, for which the resonance frequency is lowered by 1.5%. For the higher modes, the effect is indiscernible for all practical purposes.

Having shown the accuracy of the iterative in-water method, there remains one point of interest relative to the spherical shell problem. It is stated above that if finite elements are used to describe the fluid, one must contend with a large number of additional equations in the eigenvalue solution. It is also pointed out that an in-water eigenvalue solution previously was not possible with boundary elements, unless one assumed incompressibility. We will now quantify the error introduced by the assumption of incompressibility, for the spherical shell in water. This assumption implies that there is no radiation damping, and that the added mass of the fluid is computed at ka=0.

Figure 12:
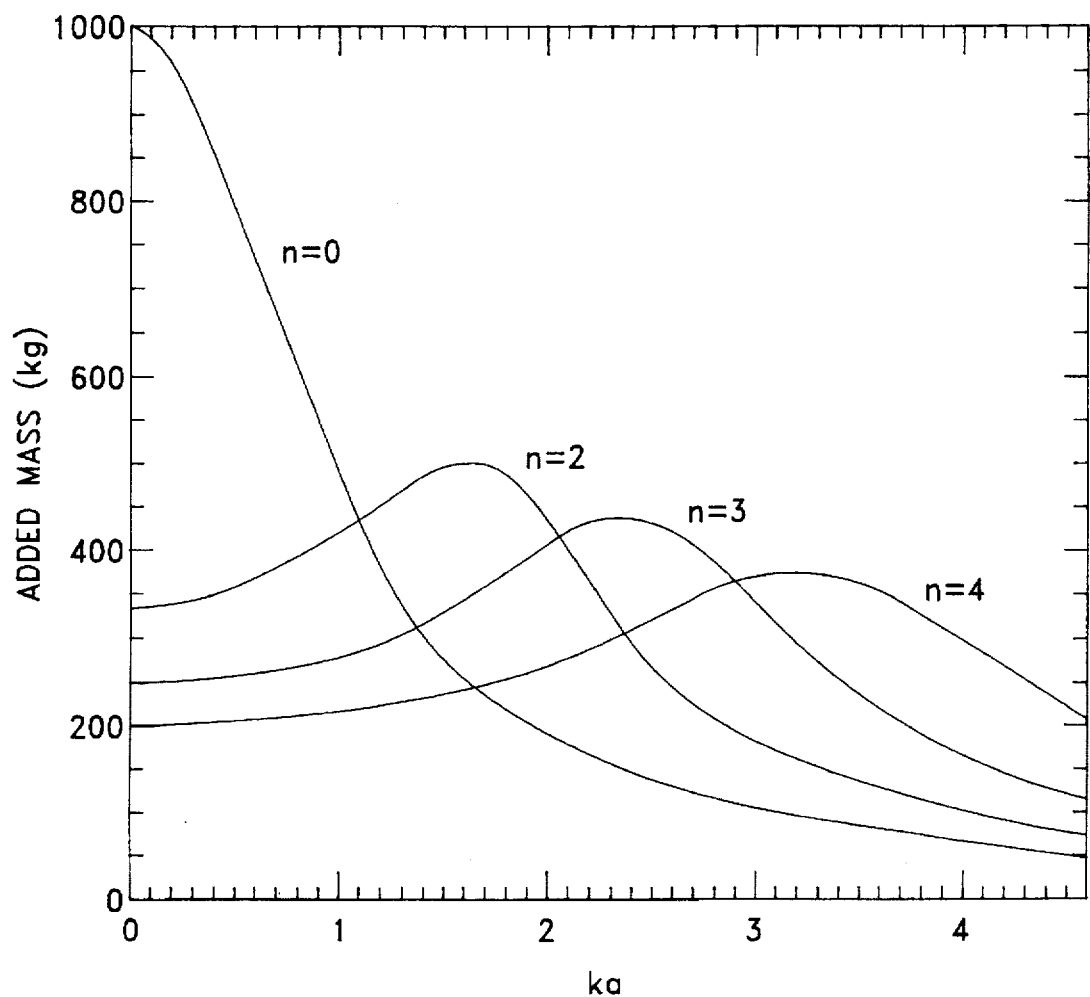
FIG. 12 is a graph illustrative of numerical values determined in Example #1.

FIG. 6 compares the results of the iterative in-water modal technique with those obtained when the fluid influence matrix, [Z], is computed at ka=0, i.e., at ω=0. For the modes in the lower branch, we see that the differences in the computed eigenvalues are between 3% and 7%, and that the eigenvalues from the incompressible solution are higher than the values obtained from the iterative technique. For the breathing mode, however, the error in the incompressible value is 66%, and it is lower than the correct value. The differences in the magnitude and sign of the error between the two branches can be explained by studying FIG. 12. Focusing on the n=2/lower mode, we see that the added mass at ka=0 is lower than the value at ka=1.1 (the value of ka corresponding to iterative eigensolution). Since the added mass is too low, the computed eigenfrequency is too high. The same is true for modes n=3 and n=4, although the eigenvalue error is progressively lower sine the error in the added mass decreases with increasing mode order. If we now consider the added mass of the n=0/upper mode (breathing mode) in FIG. 12, we see that the value at ka=0 is much greater than that at ka=4.5 (the ka value at the true in-water eigenfrequency). This leads to an incompressible eigenfrequency that is much lower than the true value. These results demonstrate that while the incompressibility approximation may be satisfactory at very low ka values, the error increases as ka increases.

EXAMPLE #2

Figure 13:
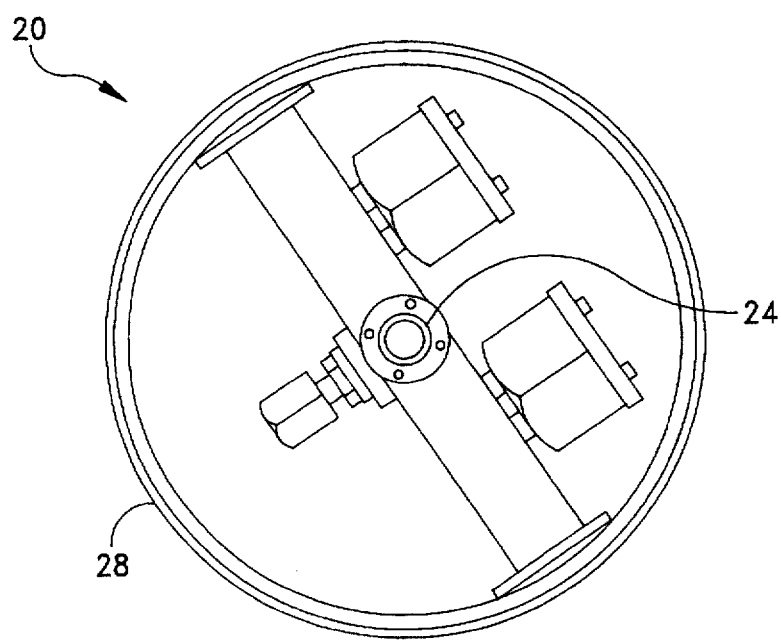
FIG. 13 is a side elevational view of an acoustic projector which is the structure under study in Example #2.
Figure 14:
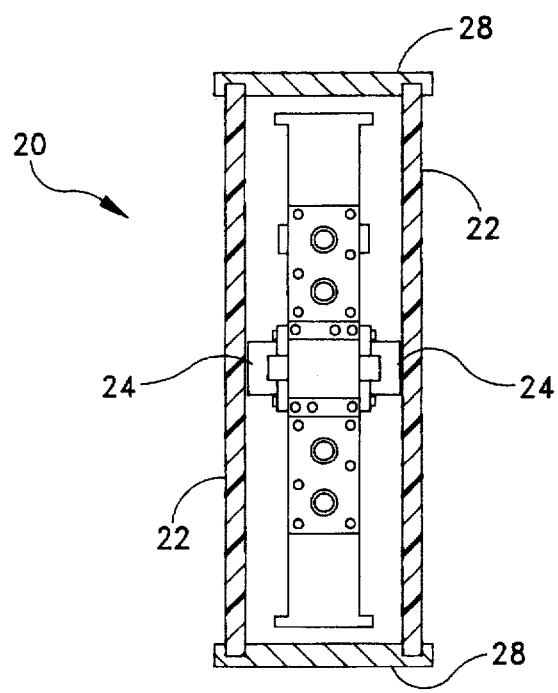
FIG. 14 is a sectional view of the acoustic projector of FIG. 13.

The second example is a low frequency projector 20 that operates by mechanically driving two opposing flexural disks 22 (see FIGS. 13 and 14). The disks 22 have a linearly varying thickness, with the greatest thickness being at the center. A circular piston 24 drives a finite area at the center of each disk 22.

The behavior of the projector 20 was described first with an axisymmetric finite element model (using the ATILA code) to determine the appropriate boundary conditions and the general character of the operational mode, which corresponds to the fundamental mode of a circular plate. Then a 3-D model was developed to study the influence of parasitic modes, i.e., undesirable modes that might interfere with the mode of interest. For both models, the fluid loading was described using the CHIEF boundary element program. At the time of the original analysis, the method described herein was not available. Therefore, the in-water behavior of the projector was determined using a harmonic analysis with an applied force at the center of the disks. For the mode of interest the flexural disks vibrate in the fundamental mode of a circular plate, which has significant accession to inertia (large added mass) under fluid loading. The result is that the in vacuo modal frequency is greatly reduced when the projector is submerged. Therefore, a broad frequency sweep and a great deal of computation time were required to determine the in-water resonance frequency using the harmonic method. This problem led to the conception of the idea for the in-fluid modal method for finite element/boundary element models.

Figure 15:
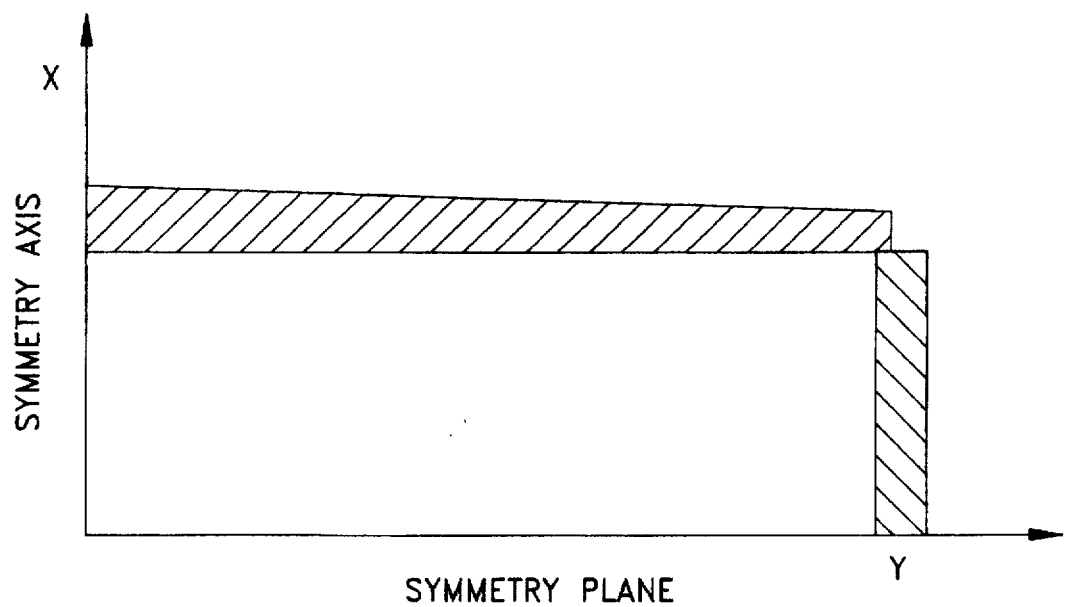
FIG. 15 depicts an axisymmetric finite element model of the projector of FIGS. 13 and 14.

The axisymmetric finite element model of the projector is shown in FIG. 15. In addition to the axial symmetry, there is a plane of symmetry through the center plane of the housing. The mechanical structure, comprising the disks, housing, and compliant pad, is modeled with eight-noded quadrilateral elements. Each node has two translational degrees of freedom. For this 2-D representation, the boundary element model is generated using line elements, with a one-to-one correspondence between the structural and boundary elements. The CHIEF code then generates a 3-D model for the computation of the fluid influence matrix. Because CHIEF cannot combine both rotational and planar symmetry, the [Z] matrix was computed for a rotationally symmetric geometry with no planar symmetry. The computed matrix was then reduced to account for planar symmetry.

The results for the in vacuo and in-water eigenfrequencies and the in-water harmonic resonance frequencies are presented in FIG. 7. The in-water ka values are also given. Mode 3 has been omitted from the results because it is a mode of the housing, and we are interested in the disk modes. In FIG. 7, we see that the in-water eigenfrequencies computed with the modified modal method are very close to the peaks in the harmonic response computed with a purely imaginary influence matrix. The effect of radiation damping on the harmonic response peaks is demonstrated by comparing these harmonic response peaks to those computed with the complex influence matrix. For the mode of primary interest in this study (mode 1), the effect is negligible, while for mode 5, there is a 1.6% difference between the two results. It is surprising to note that the modes are preserved in water for ka values at least as high as 7, but this likely is a result of the axisymmetry of the model. The nonaxisymmetric modes are eliminated, thus reducing the possibility of modal coupling.

The results presented thus far have demonstrated the accuracy of the modified modal method for a spherical shell and a flexural disk projector. It remains to show that the proposed method is also efficient. FIG. 8 presents the progression of the iterative eigenvalue calculation for the axisymmetric projector model. These results were obtained without any schemes for improving the convergence efficiency. For each of the first four disk modes, the procedure begins with the in vacuo modal frequency (column 2). For mode 1, only two in-water eigenvalue calculations are required. Modes 2 and 4 each require three iterations. Mode 5 converges to within 2 Hz after three iterations, but then begins to jump back and forth between two values. This problem would be eliminated by any of the available convergence improvement schemes, even the simple bisection method. The first and last columns of FIG. 8 give the starting and ending mode numbers for the four modes of interest. Note that the eigenvector that was fifth in the list of in vacuo modes, becomes the sixth mode in water. This switching of modal order is always a possibility because the in vacuo eigenfrequency of a higher mode whose motion is predominantly radial can be lowered more by fluid loading than that of a lower mode whose motion is mainly tangential. This is why it is very important to examine the eigenvectors, at least after the first in-water eigenvalue computation. For most problems, the largest change in the influence matrix occurs in the first iteration, so the modal order does not usually change after this step.

Figure 16:
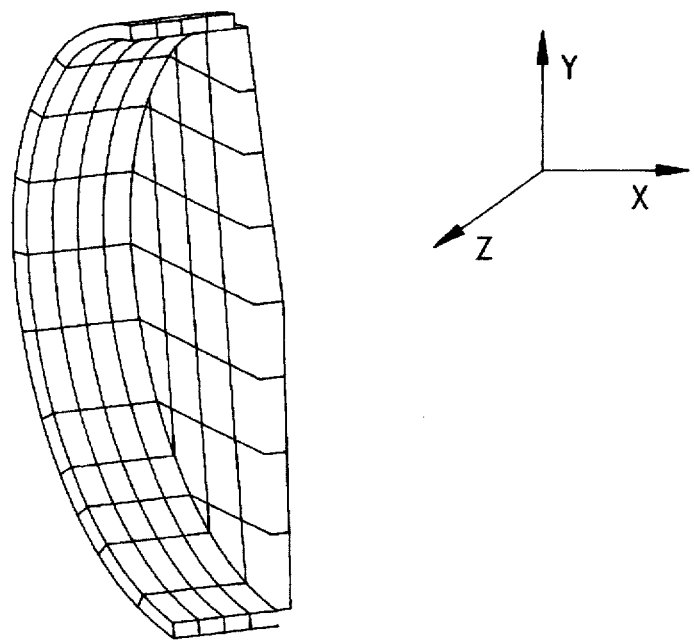
FIG. 16 depicts a 3-D model of the projector of FIGS. 13 and 14.

The full 3-D model of the flexural disk projector is shown in FIG. 16. This model has two planes of symmetry. Only the fundamental disk mode of the projector (mode 5 for the 3-D model) was studied using this model, because more elements would be required for higher values of ka. FIG. 9 provides the in vacuo eigenfrequency and the in-water eigenfrequencies and resonance frequencies for the fundamental mode. Note that the in vacuo eigenfrequency computed using the 3-D model is slightly higher than that obtained with the axisymmetric model. This is not unexpected since the two models have different mesh densities. The in-water modal frequency computed with the modified modal method is 43 Hz, while the peak in the in-water harmonic response is at 41 Hz (using either the imaginary or complex influence matrix). This difference is thought to be a result of the large number of equations in the eigensystem. While the difference corresponds to an error of nearly 5%, in practical terms 2 Hz is not significant. FIG. 10 shows the progression of the iterative procedure for mode 5.

In FIG. 9, note that the in-water eigenvalue converges after only two iterations. FIG. 10 compares the CPU time required for two in-fluid eigenvalue computations to the time required for a typical harmonic frequency sweep, both performed in ATILA on a DEC 3000/400 Alpha workstation. It is assumed (conservatively) that the first harmonic sweep is done over ten frequencies, and that the in-water eigenvalue lies within the first range of frequencies selected. The harmonic sweep requires over six hours of CPU time, while the modified modal method requires only one-half hour. If one is not so fortunate, one could spend days finding the peak in the frequency response.

The computation of in-water modal frequencies of FE/BE models using an iterative eigenvalue computation has been shown to be both accurate and efficient. The results have been compared to those of a closed-form solution for a spherical shell and those of a standard harmonic analysis for a 2-D and a 3-D FE/BE model of a flexural disk projector. For smaller numerical models, for which a harmonic analysis is not inordinately time consuming, the main advantage of the method is to eliminate the guess work in isolating the in-water eigenfrequency of a particular mode of interest. For large models, the method additionally provides a tremendous savings in computation time compared to the standard harmonic method. Furthermore, it has been demonstrated that while the error introduced by neglecting radiation damping is small, the error arising from the assumption of fluid incompressibility can be quite significant.

There is thus provided a method which is significantly faster than the prior art approach set forth hereinabove, eliminates the guesswork involved therein in locating the appropriate fluid-loaded resonance frequency, and retains the compressibility of the fluid, through the frequency dependence of the influence matrix.

It is to be understood that the present invention is by no means limited to the particular steps herein disclosed and/or shown in the drawings, but also comprises any modifications or equivalents within the scope of the claims.

What is claimed is:

1. A method for determining the approximate resonance frequency of a structure surrounded by a compressible fluid, the method comprising the steps of:

(1) using a finite element model, performing an in-vacuo eigenvalue analysis to determine in-vacuo frequencies and mode shapes of said structure;

(2) selecting one of said mode shapes as an in-vacuo mode of interest, along with the corresponding eigenfrequency of said in-vacuo mode of interest;

(3) using a boundary element program, computing an influence matrix at said eigenfrequency of said selected mode of interest;

(4) combining said computed influence matrix with structural stiffness and mass matrices from a finite element program to thereby produce modified stiffness and mass matrices, and using the modified stiffness and mass matrices, computing eigenvalues of said structure, including eigenvectors;

(5) selecting from said computed eigenvectors a computed mode having substantially the same displaced shape as said in-vacuo mode of interest;

(6) determining the eigenfrequency of said selected computed mode;

(7) determining any difference between said above determined eigenfrequency of said selected computed mode and said in-vacuo eigenfrequency of said selected in-vacuo mode of interest;

(8) wherein if said difference is equal to, or less than, a selected tolerance, said above determined eigenfrequency of said selected computed mode is the approximate resonance frequency of said structure surrounded by said compressible fluid; and (9) wherein if said difference is greater than said tolerance, repeating step (3) substituting said above determined eigenfrequency of said selected computed mode for said in-vacuo eigenfrequency for the in-vacuo mode of interest, and thereafter, repeating steps (4)–(9), substituting in step (3) a most recent computed eigenfrequency of said selected computed mode for the previously used above determined eigenfrequency of said selected computed mode.

2. The method in accordance with claim 1 wherein said in-vacuo analysis is performed using the equation:

$$[K] - \omega_i^2 [M] \phi_i = 0$$

wherein K represents a stiffness matrix, $\phi_i^2$ represents a set of eigenvalues, M represents a consistent mass matrix, and $\phi_i$ represents a set of orthogonal eigenvectors.

3. The method in accordance with claim 2 wherein said computation of said eigenvalues of said structure in a compressible fluid are undertaken utilizing the equation:

$$\{[K''] - \omega_i^2 [M'']\}\{\phi_i\} = \{0\}$$

wherein $$[K''] = [K] + j\omega_o Re[Z(\omega_o)],$$

wherein $$[M''] = [M] + \frac{Im[Z(\omega_o)]}{\omega_o},$$

and wherein $\omega_o = 2\pi f_o$;

$f_o$ = said characteristic eigenfrequency of said selected in-vacuo mode shape;

Re represents the real part of [Z];

Im represents the imaginary part of [Z];

Z = said computed influence matrix; and $i = \sqrt{-1}$.

* * * * *